(12) United States Patent
Chan et al.

(10) Patent No.: US 12,462,562 B2
(45) Date of Patent: Nov. 4, 2025

(54) MULTIPURPOSE VISUAL AND AUDITORY INTELLIGENT OBSERVER SYSTEM

(71) Applicants: Andy Tsz Kwan Chan, Hong Kong (HK); Yuk Kwai Lee, Hong Kong (HK)

(72) Inventors: Andy Tsz Kwan Chan, Hong Kong (HK); Yuk Kwai Lee, Hong Kong (HK)

( * ) Notice: Subject to any disclaimer, the term of this patent is extended or adjusted under 35 U.S.C. 154(b) by 342 days.

(21) Appl. No.: 18/088,121

(22) Filed: Dec. 23, 2022

(65) Prior Publication Data

US 2024/0212349 A1 Jun. 27, 2024

(51) Int. Cl.
*G06V 20/40* (2022.01)
*G06T 7/246* (2017.01)
(Continued)

(52) U.S. Cl.
CPC .............. *G06V 20/41* (2022.01); *G06T 7/248* (2017.01); *G06V 10/7715* (2022.01); *G06V 10/774* (2022.01); *G06V 10/82* (2022.01); *G06V 20/52* (2022.01); *G06V 40/20* (2022.01); *G06T 2207/10016* (2013.01); *G06T 2207/20016* (2013.01); *G06T 2207/20021* (2013.01); *G06T 2207/20081* (2013.01); *G06T 2207/20084* (2013.01); *G06T 2207/30196* (2013.01); *G06T 2207/30232* (2013.01); *G06V 2201/07* (2022.01); *H04N 23/80* (2023.01)

(58) Field of Classification Search
None
See application file for complete search history.

(56) References Cited

U.S. PATENT DOCUMENTS

| | | | |
|---|---|---|---|
| 9,129,148 B1 * | 9/2015 | Li | G06F 16/122 |
| 2003/0208289 A1 * | 11/2003 | Ben-Arie | G06V 40/20 |
| | | | 700/83 |

(Continued)

OTHER PUBLICATIONS

Fully Automatic Analysis of Engagement and Its Relationship to Personality in Human-Robot Interactions, by Salam et al. IEEE Access, Received Jul. 21, 2016, accepted Aug. 30, 2016, date of publication Sep. 30, 2016, date of current version Mar. 6, 2017. (Year: 2016).*

*Primary Examiner* — Vikkram Bali
(74) *Attorney, Agent, or Firm* — W&P

(57) ABSTRACT

An edge device for using a Multitask Embedded Deep Learning Technology to perform cognitive analysis over high definition video at real time without streaming the video frames to cloud processing. The technology mimics human multi-level cortex function. The device comprises a video camera, at least one embedded processor for analyzing digital video signal output from the video camera, a mission control program module for translating user instructions into configuration parameters, a vision analysis program module including at least one pre-trained ML model within the embedded processor, an object segmentation program module comprising a plurality of MLU, a behavior analysis program module including independent neural network backbones coupled to a neural network top layer. The plurality of MLU comprises a simple neural network backbone, a fully connected network (FCN), a standard regressor FCN network, and a recurrent neural network (RNN).

10 Claims, 5 Drawing Sheets

(51) Int. Cl.
  *G06V 10/77* (2022.01)
  *G06V 10/774* (2022.01)
  *G06V 10/82* (2022.01)
  *G06V 20/52* (2022.01)
  *G06V 40/20* (2022.01)
  *H04N 23/80* (2023.01)

(56) References Cited

U.S. PATENT DOCUMENTS

2008/0108069 A1  5/2008  Barber et al.
2019/0340487 A1  11/2019  Aggarwal et al.
2021/0150745 A1  5/2021  Yang et al.
2024/0290092 A1* 8/2024  Rao ........................ G06V 20/35

* cited by examiner

Figure 2. Attention Illustration

This figure presents a typical analysis workflow of the system in Fig 4. The final workflow could be a subset of it depending on the specific requirements of the use cases

MULTIPURPOSE VISUAL AND AUDITORY INTELLIGENT OBSERVER SYSTEM

FIELD OF THE INVENTION

The present invention relates generally using deep learning technology to perform cognitive analysis over video at real time without using streaming video frames to video processing. Specifically, this invention relates to using analyzing video signals from video source using pre-trained modularized learning units and models.

BACKGROUND OF THE DISCLOSED TECHNOLOGY

High definition video analytics are needed for use cases like Video Surveillance, Video Conferencing, Sport Broadcast, Educational Simulcasting, Social Media Live Streaming, Video Production, etc. Ultra HD video (3840×2160 or above) can capture, stream and display scene and subjects with unprecedented clarity. However, HD streaming bandwidth is prohibitively high, making it expensive, impractical and unreliable for live streaming and cloud based video analytic purposes (to social media, broadcast, education, security monitoring, etc.), especially through wireless. Bandwidth requirements: 854×480–480p, recommended bitrate=3 Mbps, 1280×720–720p, recommended bitrate=5 Mbps, 1920×1080–1080p, recommended bitrate=8 Mbps, 3840×2160–4K, recommended bitrate=25 Mbps (rarely used for live streaming)

Other types of cameras like 360 degree sport cameras and high definition fisheye security cameras are also becoming popular which can record all areas around the camera. Those cameras require high data bandwidth to stream the full 360 degree scenes.

Existing video analytics solutions have several drawbacks. They cannot adapt to environment changes well. Non-adaptive algorithms are trained for specific scenes, viewing perspectives and conditions. For example, when the scene being monitored changes from indoor to outdoor (where the lighting, perspectives and distance from objects change), the algorithms' effectiveness will greatly deteriorate.

Existing systems are designed for specific use cases (e.g. analysis pedestrian traffic, detecting public safety threats). For example, security camera systems installed are dedicated for surveillance purposes. However, in an organization, there may be multiple departments that would like to use the camera system. In smart city application, there is a need for monitoring parking space for traffic department, providing pedestrian analysis for commerce department, while providing public safety service for police department.

A typical neural network is made up of many layers (e.g. convolution neural network (CNN) layer, fully connected (FCN) layer, etc). Deep neural networks are usually made of over a hundred layers. Layers are formed by neurons like operators, which include weighted sum of inputs from the previous layer plus a bias. Each neuron also has an activation function mimicking the firing of signal to the following layers. Discrete complex neural networks are developed for specific functions like object detection, face recognition, object tracking, behavioral analysis. Each neural network has tens of millions of parameters to be tuned in order to be effective.

There are several problems for current neural network implementations. Current implementations are typically end to end neural networks that do not use a more efficient multi-layer design like human beings' visual system. Some neural layers and parameters are overly complicated, consume extra powers and require more expensive processors. The neural networks like object detectors are trained to detect objects in still pictures or snapshots. Each frame runs through a complement neural network. Applying detectors on a frame by frame basis is wasteful. In video, there is a lot of information that can be applied across temporal domain. Nevertheless, current implementations typically have discrete complex neural networks that are developed for specific functions like object detection, face recognition, object tracking, behavioral analysis, but there is no integration to reuse information among the networks. These limitations result in high end computer systems that are needed with high end processors (e.g. graphical processor units with thousands of computing cores) and a lot of memory. Those systems are expensive and inefficient for mass markets. For example, current object detection will usually need more than 100 milliseconds per frame on high end PC. While tracking will need 30-100 milliseconds. Behavior understanding will need 100 milliseconds. It cannot run at real time if all components are needed simultaneously.

One design strategy is to have existing edge devices perform basic filtering like coarse motion detection. When it detects activities, video frames are streamed to a cloud processing unit for more advanced analysis like human behaviors or group behaviors. This design strategy has a few limitations of its own, including 1) High bandwidth consumption for higher definition video. It is costly and not feasible when there is a large number of camera sources, 2) Network connectivity issues can cause real-time response failure, and 3) Network latency prevent real-time response.

In typical visual analytics systems, valuable contextual information are not used to enhance and extend analysis results. Contextual information includes but not limited to geographical location of the camera, social media information gathered around the camera, weather information and breaking news. They also do not leverage information from other cameras under similar operating conditions to enhance analysis results. Algorithms and machine learning models are pre-programmed.

A better device and approach is proposed to overcome the limitations in the above known video analytics solutions.

SUMMARY OF THE INVENTION

The present disclosure is directed to implementing a multi-purpose intelligent observer system on network edge. The system can perform a combination of autonomous, adaptive and real-time cognitive functions (detection, tracking, identification, behavioral understanding and etc) like human observers that attentively track and monitor targets (People, cars and assets).

Based on a high level user-friendly instruction from the user (e.g. "let me know when someone is lingering at the front yard"), it can focus attention on one or more targets, follow the subjects, understand the behaviors and derive relevant actionable information. The system uses multi-modal vision, auditory and/or radio (RF) sensors. The system can run on a device (PC, mobile phone or intelligent gateway) that a camera is attached to or integrated into a camera. The system performs cognitive analysis on network edge. The system's performance can also be continuously improved through a cloud model and data center for machine training.

The system comprises a local processing unit that Is connected to one or more sensors, and in turn driven by vision attention module that behaves like virtual human observer. The local processing unit uses a Multitask Embedded Deep Learning Technology that mimics human multi-level cortex function, tightly integrates learning based algorithm (e.g. deep neural network), visual attention model (e.g. recurrent neural network) and low level highly efficient evolutionary based pre-defined computer vision algorithm (like human vision systems' magno cells that detect high motion areas and parvo cells that detect static texture under low light conditions). The local processing unit supports multiple users with different usage scenarios (like public security, pedestrian analysis and smart parking management, etc.) simultaneously.

The system dynamically choose operation mode depending on the state of camera operation, and can dynamically choose algorithm parameters depending on the operation conditions like using high sensitivity parameters during low light conditions. It can change from tracking multiple objects using stationary camera to tracking select objects with high details, efficiently focus attention on the targets being tracked to extract segmentation mask and skeleton model for subsequent behavioral analysis. The behavioral analysis can detect single person activities and group activities. Natural interaction through text or voice are supported. The system can behave as virtual camera feed that can intelligently follow targets for broadcasting, security monitoring, and/or live streaming purposes.

The novel Multitask Embedded Deep Learning Technology is well suited for implementation on embedded processors by ignoring irrelevant information. Besides, after filtering out unnecessary information by using the low level algorithm 800 and dynamically choosing algorithm pipelines, it allows learning based neural network stage to be simplified. The algorithm allows more efficient predefined computer vision algorithms to be implemented on efficient traditional digital signal processing (DSP) pipelines. Besides, the simplified neural network can be implemented on the limited graphical processing unit (GPU) and AI engine provided by embedded processors.

The system also comprises a cloud unit that manages a network of vision attention system. Cloud machine training center continuously update the vision attention system with new machine learning models, and refine model using real scene-specific video and image data captured from a specific camera, thus refining models to perform well for that particular camera. The video and image data can be annotated automatically using non real-time high precision version of the intelligent observer system running on the cloud. The center has a Community Model and Data Unit that generates models from a group of observer system with similar usage scenarios. The unit uses common benchmark dataset to rank models of a group of observer system. The champion model can be used as the initial off-the-shelf model for new observer system. The champion model is also compared with individual observer's model on scene specific data to determine if the individual observer's model should be replaced with the champion model.

DETAILED DESCRIPTION OF EMBODIMENTS OF THE DISCLOSED TECHNOLOGY

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

This disclosure is an efficient autonomous multi-purpose visual/auditory intelligent observer system (IOS) (FIG. 1) that can turn a conventional video system (e.g. surveillance cameras, webcam) into one or more virtual intelligent observers or monitoring agents. The observer is able to determine the who, what, when, where and how an event happens, based on the mission criteria input by the user(s). It can be customized to serve a number of missions and users simultaneously. The system can be: 1) A subsystem that is integrated into a standalone camera, 2) A subsystem installed in a personal computer (PC) or a gateway device. One or more external cameras are connected through wired (e.g. USB/HDMI, FireWire, etc.) or wireless (WiFi, Cellular network, etc.) methods to the device/PC, and/or 3) A software/hardware subsystem in a mobile device with camera.

IOS Core Module

Figure 4:
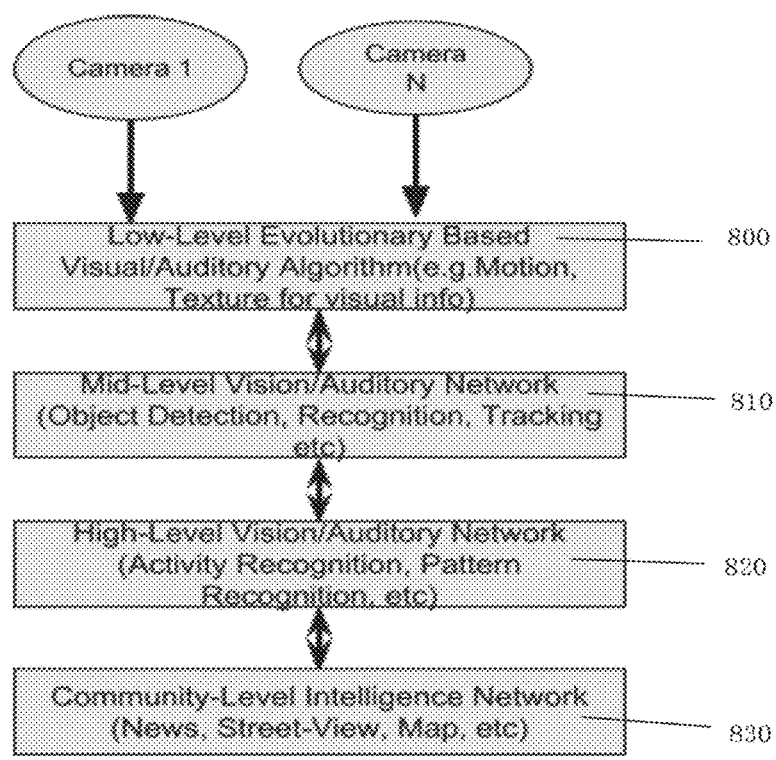
FIG. 4 illustrates a Multitask Multilayer Embedded Deep Learning Engine Technology In Attention System Module.

IOS is based on an efficient Multi-Task Multi-Layer Embedded Deep Learning Engine Technology In Attention System Module (FIG. 4). IOS uses a modularized learning unit (MLU) concept. Each MLU can learn different aspects of visual information: Object Features, Object Classifications, Object Location/Size/Orientation, Object Tracking, etc. Each MLU has one or more inputs, one or more outputs. Each MLU is identified by the system by its deep learning class, supported input/output data type, supported formats and supported resolutions. MLU include but not limited to following classes:

Feature Map LU: This MLU class can extract features from visual information. Features are typically obtained by applying 2D convolutional filters to the input images. The filters are able to extract subtle properties of objects (e.g. edges, key points). The end result of this unit is a multi-resolution feature map. It is conventionally called feature pyramid. The feature pyramid contain features at different scales compared to the input image resolution, for example, $\times\frac{1}{4}$, $\times\frac{1}{8}$, $\times\frac{1}{16}$, $\times\frac{1}{32}$ etc. The multi-resolution feature map will be heavily used for various analysis of objects at different sizes. The number of features varies from a few dozen to a few thousand. Usually, the more features (also known as channels or filters) will be able to handle more complex classifications but the computation and memory cost will be greatly increased as well.

Simple Object Classifier LU: This is used for predicting the presence of and the class of objects at predefined anchor regions. The anchor regions are a set of boxes at predefined aspect ratios (e.g. 1×2, 1×1, 2×1) and predefined scales (e.g. $\times\frac{1}{4}$, $\times\frac{1}{8}$, etc). They can reduce computation requirements. Fully connected networks (FCN) are trained to predict object classes at the anchor regions. We use standard anchors and classifier networks.

Bounding Box LU: This is used to generate the final bounding box of the objects. We use standard regressor FCN networks for generating the bounding box offset from the anchor regions.

Other MLUs: Tracker LU, Segmentation LU, Keypoint LU, etc.

IOS MLU has following characteristics:

MLUs can be connected dynamically using directed acyclic graph (DAG) depending on the runtime requirements of the use case. The connection of MLUs is controlled by high level software.

MLU has several states of operations:

Idle: Nothing is loaded. Consumes zero memory and computation resources.

Provisioned: Code and weights are loaded into memory.

Connected: Input and output data buffers are allocated and ready to send/receive data.

Running: Actively processing data.

Each MLU is individually configurable according to the high level requirements. For example, the Feature Map LU can dynamically disable generating high resolution feature maps when the use case is not interested in larger objects. Or the Object Classification LU can be changed to classify different sets of classes. Different scenes usually has different types of objects. Different classifiers are needed. The capability to quickly swap the classifier LU's configuration allows the system to adapt to runtime changes quickly. A typical neural networks contains tens of millions of weights and parameters, which is equivalent to dozens of megabytes (MB) of data. Loading those data into memory from storage (e.g. SSD) will take at least 30-100 ms to switch the configuration. That will introduce a latency of at least a few video frames. Our design can reduce the amount of data to less than a few MB, thus greatly reduce the latency for the system to dynamically switch the MLU to adapt to different usage contexts.

Each MLU output can be broadcasted to multiple targets. The Feature Map LU output can be connected simultaneously to the Classifier LU to identify objects and also to Tracker LU to individually track object instances. So, the feature map data can be reused for multiple purposes, and the resulting video analytic solution can adapt to various usage contexts efficiently within an embedded environment without duplicating operations and data.

IOS also use layered algorithms that mimic human visual system.

Low level algorithm 800 that contains a set of algorithms that are used to derive information like motion, mimicking the magno cells of human vision system. In human, those functions are inherited through many years of evolution. They are efficient. IOS implement those functions with simpler mathematical functions to consume very little computation resources. This layer only pass relevant regions of interest (e.g. high motion and static areas) to higher level algorithms. Low level visual functions can define regions of interest (ROI) to reduce the computation requirements of higher level neural network layers. There are at least two types of ROI: High motion ROI and Static Object ROI.

When the application is interested in tracking moving object, high motion ROI will only operate on pixels that have motion in temporal domain. The neural network in higher level for object detection and tracking will only operate on high motion ROI, it usually reduce the inference operations by at least 50%.

When the application is interested in detecting suspicious objects that have been left at a scene, the static ROI triggers higher level neural network to recognize the object only at specific frame and specific pixel areas. This will significantly reduce the inference operations (by at least 90%).

Besides, low level algorithms 800 require low resolution, usually less than 4 times the original resolution. So insignificant amount of computation resource is needed while reducing the computation requirements of higher levels.

Mid level algorithms 810 contains lightweight machine learning algorithms focus on object detection, recognition and tracking at areas confined by low level algorithms 800. Objects of interests are detected at this level and they are tracked to generate the location and size information (x, y coordinate and size). Note that not all objects are needed to be processed. Only objects that are needed (e.g. people of interested identified, moving cars in a specific designated areas) to be further processed. The number of object classes is limited to be small (<8), besides the areas are confined by the ROI. So the neural network parameters can use reduced precision like 8 bits. This allows embedded processors to be able to handle object detection and tracking at real-time.

Short term temporal information from low level algorithm 800 is also used. Let's say an object detected in frame one, in the second frame, low level vision can provide motion vectors information that will provide the region of interest for the second frame. Thus a much simpler neural network can be used that can detect object of a small region. On the other hand, High level algorithms 820 use the information over a period of time on the region of interest sent from low level algorithms 800 to derive more advanced information. The tracked object from mid-level algorithms are dissected into key points or segments (e.g. a human object is transformed into a set of skeleton joints and a car object is transformed into a set of components like doors and tires). Machine learning algorithms use a sequence of key points/components over a period of time to determine the behavior of the object. Furthermore, groups of key points/components are combined and further define group behaviors.

The algorithms are customized to run on resource limited devices using standard embedded system optimization methods like floating point to fixed point conversion of models, load balancing between processor subsystems (CPU, GPU, DSP and AI engine), and profiling.

Low, Mid and High level algorithms run in real-time on edge devices, without requiring real-time decisions to be made in the cloud.

Optionally, more sophisticated high level algorithm 820 can run on a cloud infrastructure. Community level algorithm 830 provides contextual information like weather, traffic that can be injected into or overlay on top of the results from the lower level algorithms. For example, Google street view 3D scenes can be used in conjunction with the object tracking information and camera location information to derive the 3D locations of the objects under observation. Besides, the local business information allows the system to give more precise description of analysis result. For example, a fight between two people are detected at McDonalds' at the intersection of Street X and Street Y.

Figure 5:
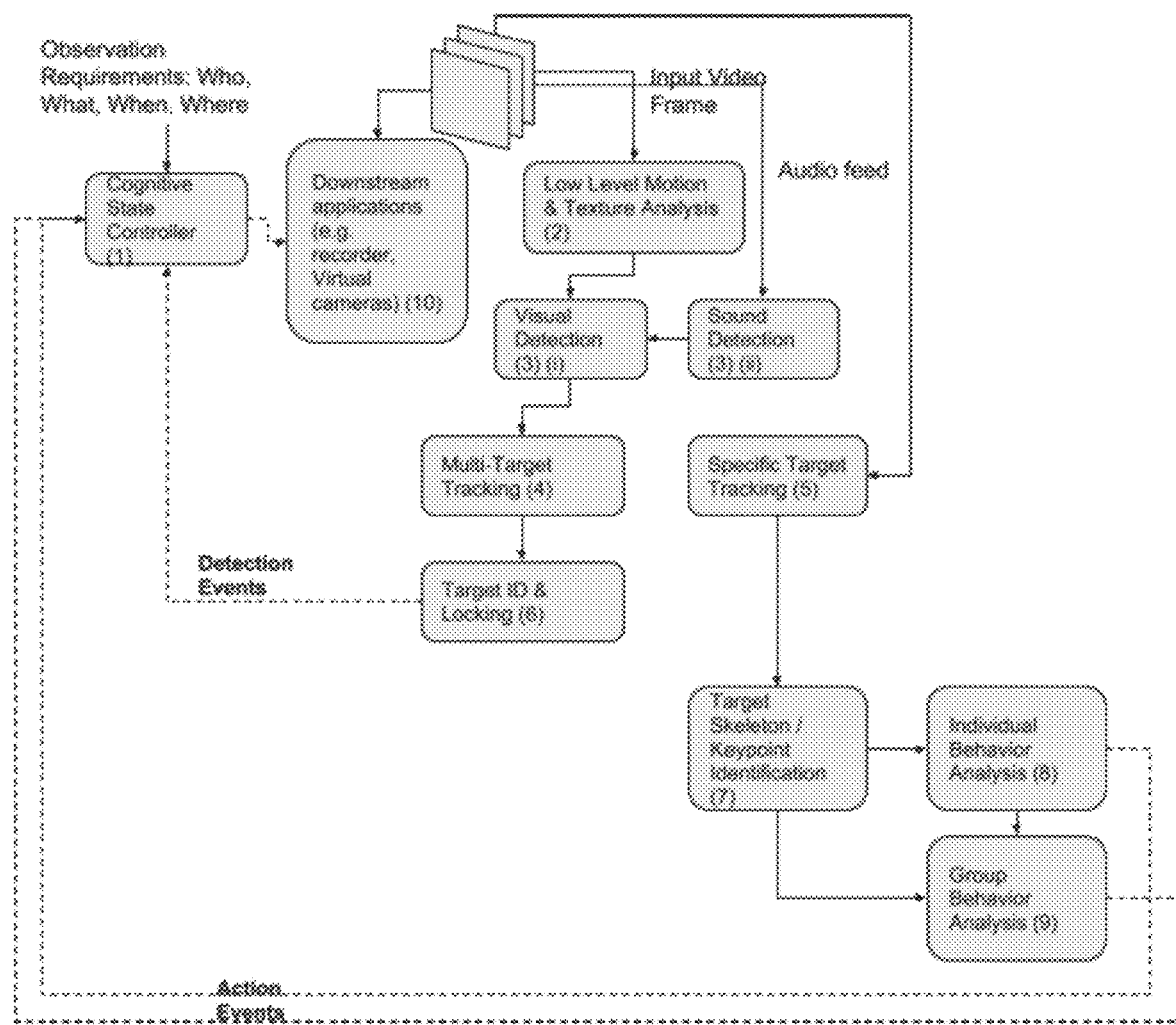
FIG. 5 is an Analysis Workflow illustration.

FIG. 5 details the steps of analysis process. The core module's action is directed by a cognitive state controller:

Step 1. Cognitive state controller (1) receives instruction from the application that specifies the criteria of looking for observation targets (who, what, when, where, action). One example scenario: the high level application receives order to (i) detect violent activities at an intersection, (ii) follow zoom into the offender, (iii) take high definition snapshot of the offender (iv) detect any fleeing vehicles:

Observation criteria input to (1):

Who? Anyone

What? Weapons (guns, machete, etc), vehicles
When? 11:00 pm to 3:00 am
Where? Intersection of road
Action? Fighting, Shooting.

Step 2. (1) Initialized system to Default Camera View Mode (Mode A). (1) sets algorithm parameters and select pre-trained model depending on the time of operation (e.g. day time vs night time) and scene (e.g. indoor/outdoor) to maximize the performance of the operation.

(1) setup low level vision analysis algorithm submodule (2) into default stationary camera mode (mode A). (2) uses a set of mathematical filters to enhance the spatial temporal information extracted from the video input. The spatial temporal information can be used to compute the motion mask information, which is used to determine areas of high motions within view. At the same time, texture information be enhanced over frame sequence for relatively static areas of the video.

Initially, (1) configure (2) to detect motion and extract areas with movements, assuming the camera is relatively stationary (1) also automatically setup (2) to enhance texture details under low light conditions (1) setup visual and audio detector submodule (3)

Initialize (3)(*i*) to detect people, sofa, tables, shelves objects. Information from (2) reduce the areas for visual object detection. This greatly reduces the computation requirements that CPU can be freed up for other algorithm modules.

Initialize (3)(*ii*) to detect gunshot or broken glass sounds.

(1) setup multi-target tracker submodule (4) to follow multiple people within view. The multi-target tracker submodule can efficiently track many objects simultaneously. To achieve that, it is critical to reduce the computation requirements, motion mask from (2) is fed to (4) to greatly limit the range of search area for the tracker. Several alternatives can be used to realize object tracker. One option is to combine long term feature learning and short term correlation filter with channel and spatial reliability (CSR).

(1) continues to receive real-time detection and multi-target tracking information.

(1) locks to specific targets that match the target selection criteria, for example, when the target enters specific area.

Step 3. (1) Direct the system to enter Specific Target Tracking Mode (Mode B)

(1) switch the system to specific target tracking mode (mode B).

In this mode, the system can direct the camera to move, zoom in and follow the locked targets.

(1) direct video sequence to be fed directly to Specific Target Tracking Algorithm submodule (5).

(5) uses visual attention model to track the location of locked target. Visual attention model is able to adaptively focus on a sequence of regions and only process the selected regions at high resolution. It can perform tracking efficiently (1) initialize visual attention model to set focus on one or more targeted objects, using the location information from Mode A. There are several alternatives of implementing the visual attention model. One implementation of visual attention model uses recurrent neural network (RNN).

Step 4. Skeleton and Keypoint analysis

The bounding box from Step 3 is used to crop the frame sequence to generate close up view of the target persons or cars Feed the cropped image sequence through a simple neural network backbone that generates features specifically for human and car classes. The backbone implementation will be very efficient because of the reduced resolution and is specifically for persons and cars. The features data generated by the backbone is then fed to the head of the neural network, which is a fully convoluted network (FCN) that generates segmentation mask of the targeted object. The segmentation mask produce the skeleton of human or keypoint of cars.

Step 5. Behavioral Analysis

Behaviors are divided into behavioral sets. Each set is designated for certain usage scenarios. For example, "punching", "hitting", "shooting" are grouped into violence behavior set. That will be used in usage scenarios that detect violence activities. Or "dumping", "graffiti" are grouped into vandalism activities.

(1) selects the correct set of behaviors dynamically, depending on the instructions given by the user A temporal sequence of skeleton data in a configurable timespan (e.g. 10 seconds) are used to accurately detect the action, within a behavioral set defined above, of the persons.

Skeleton is a set of joint positions with x,y coordinates. Two types of information are generated from the temporal sequence of skeletons:

A sequence of relative locations of skeleton joints

A sequence of motion vector of skeleton joints (dx, dy between frames)

The two channel of information is fed into two independent neural network backbones. The output of the backbones are then fed into a neural network top layer to predict the action.

Behavioral analysis also support individual behaviors and group behaviors. Individual behavior focus on actions performed by a person. Group behaviors derive interactions between multiple persons (e.g. robbery, riots) by analysing the skeleton models of persons within close proximity.

Overall IOS System

Figure 2:
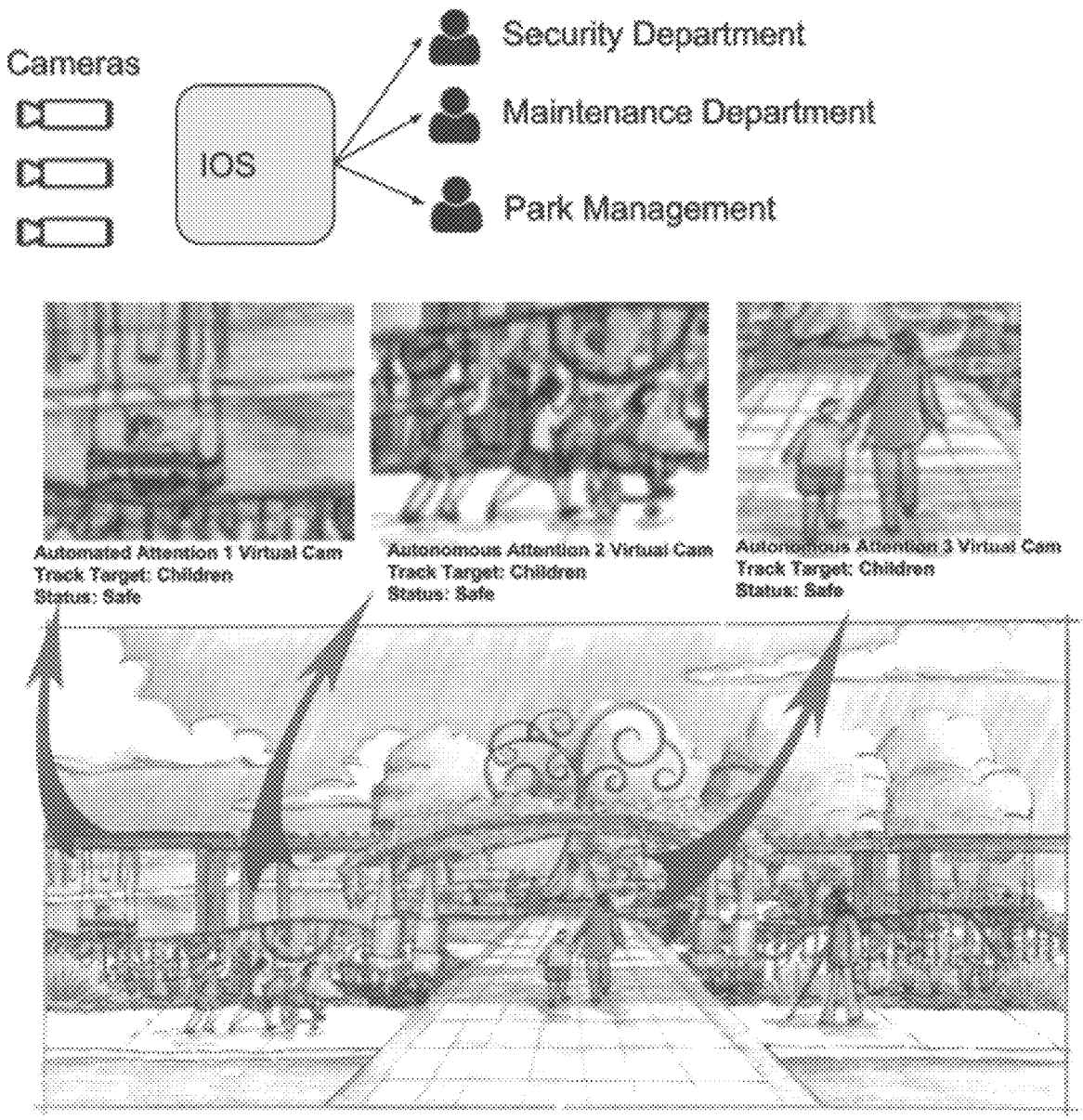
FIG. 2 is an attention illustration.

IOS is built around the Core Module described in the previous section. It can accept instructions/missions from one or more users. It can self-configure dynamically and able to automatically focus attention on target subjects (People, Car, Assets) within viewing, audible and radio range of the camera. The attention system can zoom into the targets and use the extracted visual information to understand the behavior of the targets. The process is presented in the previous section. FIG. 2 is an illustration of one possible usage scenario of managing a park. A set of cameras can be connected to IOS. IOS are shared by multiple departments, which have different goals of using the same set of cameras. The security department focus on suspicious activities around children. The maintenance department focus on safety of the facilities (e.g. pedestrian falling). The park management focus on crowd management. The IOS configures and connect low level vision and auditory components on-the-fly to derive relevant real-time information (e.g. motions, track paths, poses and gestures).

Figure 3:
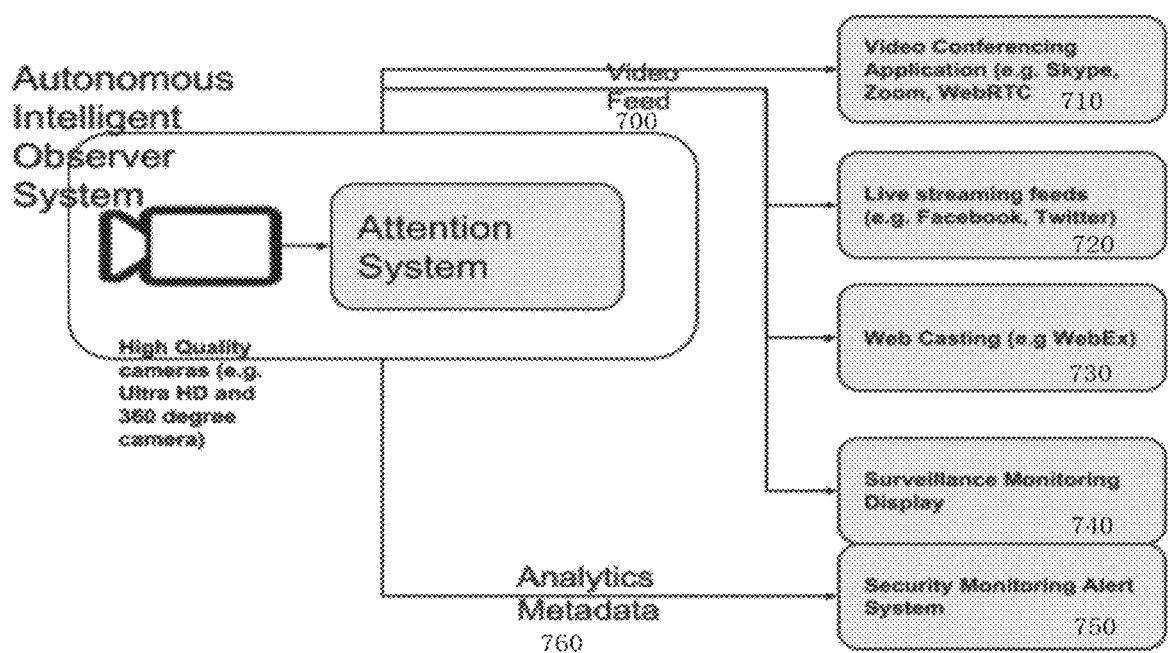
FIG. 3 is a diagram illustrating integration with various applications.

IOS's core module focus on target objects under observation and ignores irrelevant video data, thus conserving bandwidth and storage for the most interesting Regions Of Interest (ROIs). A ROI is either a moving rectangular bounding box area or irregular shape segmented area that extracts out the exact shape of a target subject. A ROI has very high resolution and quality. IOS can function as the frontend for many applications. FIG. 3 shows various use cases like surveillance and video conferencing. IOS can act like a virtual camera to those apps such as video feed applications 700: video conferencing 710 including Skype, Zoom, and WebRTC; live streaming feeds 720 such as Facebook and Twitter; Web casting 730 such as WebEx;

surveillance monitoring display 740. Moreover integration can be done with security monitoring alert systems 750 using analytics metadata 760.

Figure 1:
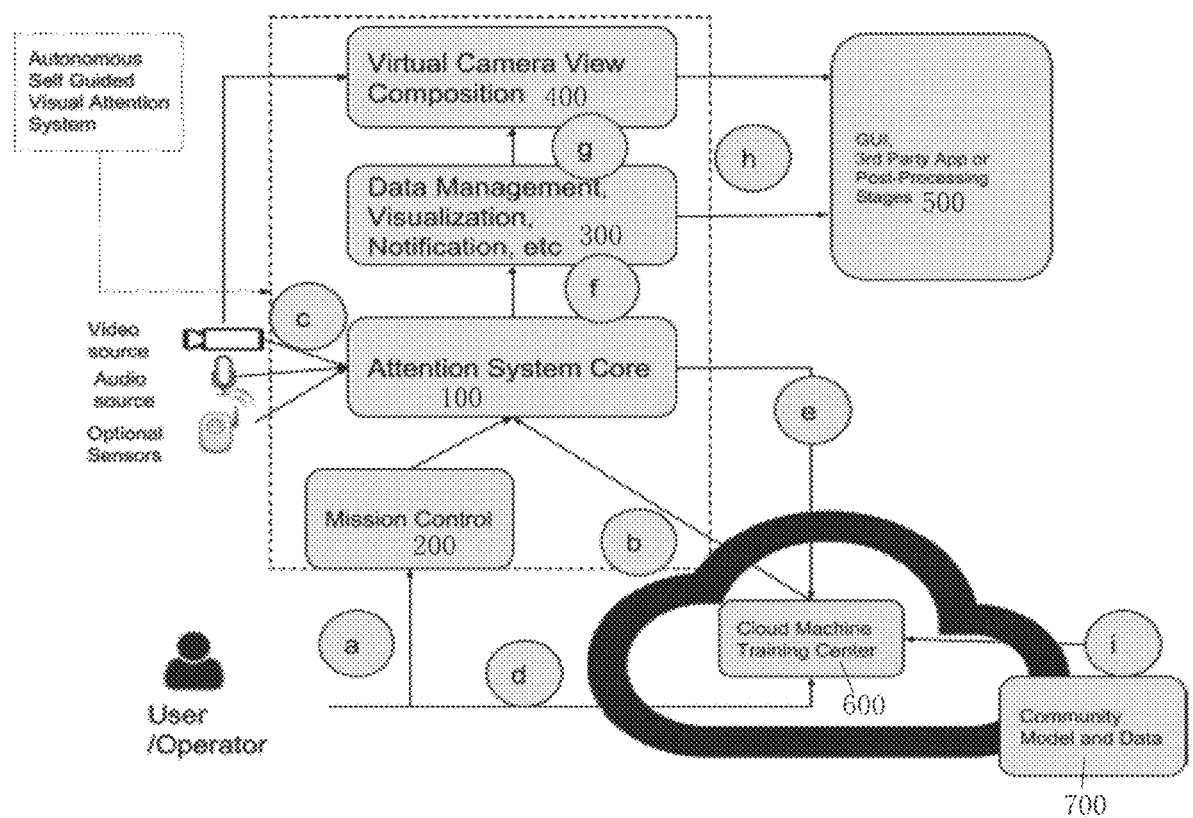
FIG. 1 shows an overview of Autonomous Intelligent Observer System (IOS).

FIG. 1 illustrate the overall IOS that is integrated with user interface, cloud service and other applications:

(Circle a) There can be one or more users of the system. The users tell IOS their specific requests and requirements. Here, the mission control block 200 is responsible for interpreting the users' requests. The users make request through a friendly interface (text, voice or forms). For example, one user can say or type "Please keep an eye on the door for any strangers". Another user can say or type "Please keep an eye for the postman". Or another user can say or type "Let me know if my baby cries". The mission control block 200 then translate the request into configuration parameters and submit that to the attention system core 100. The configuration parameters include but not limited to following:

The usage scenario (e.g. Security monitoring, video conferencing, etc).

The types of subjects under observation (e.g. People, Car, Dogs, etc).

Subtypes of the target subjects (e.g. Children, Elderly, Truck, etc).

Results needed (e.g. Statistics, Virtual Camera output-video stream focusing on an enhanced and highlighted portion of the scene, Picture snapshot, etc).

Areas of attention that it wants the attention system to focus on. (e.g. Around the entrance or around basketball court.) Here the user can draw an area on the viewing screen to specify the attention areas.

(Circle b) The attention system core 100 retrieves the latest trained machine learning (ML) models from the cloud 600 or locally. The ML models are used to configure the attention system core 100's ML subsystems (e.g. Deep Neural Network).

(Circle c) The attention system core 100 module has multimodal inputs that feed into a Multitask Embedded Deep Learning Technology (FIG. 4) that monitors the subjects of interest (Monitoring function includes but not limited to detection, recognition, identification, tracking and behavior analysis).

Auditory Sense Module: sound source recognition (e.g. Gun shot, broken glasses, dog barks, etc) and localization (e.g. use triangulation method)

Optional RF sensor module (e.g. WiFi signal scanner to track WiFi signal sources)} that performs localization and identification of mobile devices carried by the person.

(Circle f) The attention system generates metadata includes but not limited to a module 300 for data management, visualization, and notification:

Timestamp associated with the video frame that contains region of interest (ROI) under observation:

Bounding box information (coordinates) of ROI

The types of subjects detected in ROI:

Detailed information (e.g. tag, assigned identity, true identity, activity—poses and behaviors) of subject detected in ROI (Circle g) The metadata is forwarded to virtual camera composition module 400. It use the metadata to generate video sequences and/or photo snapshots that specifically track the subject. The video sequences are cropped from the origin video, so require less bandwidth but retain the quality.

(Circle h) Both metadata and video sequences are forwarded to post processing components or 3rd party external applications 500 that will handle the information base on specific use cases. API is provided to external applications to dynamically control and configure the attention system base on the needs of the applications.

Self-Learning Capabilities

The system can continue to improve the algorithm performance, using a two way learning approach on Cloud Machine Training Center (CMTC). It is used for generating and updating new machine learning models customized for individual IOS (IIOS). As detailed in IOS Core Module section, it is driven by integrated detector model, multi-object tracking model, attention model, skeleton model and behavioral models. The following process is used to update IIOS's models to improve performance.

CMTC can be deployed on a cloud infrastructure or on a machine close to the user in case privacy is a concern. CMTC uses a two way model refinement approach: 1) Scene specific learning, and 2) Community learning.

In (Circle d) Scene specific learning mode of operation, there is a setting that the user can set to allow additional scene specific training data captured by IIOS to send to CMTC. The IIOS labels the data with contextual information that includes the usage scenario specified in the previous section, when and where the data is captured. There are two ways to process the captured data to generate ground truth datasets: 1) IOS provides user interfaces for the user to set bounding boxes and labels of the target subjects under observation, and 2) CMTC runs a non-real time high precision version of Core Module algorithms to generate labelled detection, tracking and behavior prediction results. CMTC periodically initiate deep learning model fine-tuning process that selects model weights to minimize the errors of detection, tracking, mask generation and behavior classification results.

In (Circle i) Community Learning mode 700, a group of IIOS with similar use cases form IOS groups. IOS community members contribute trained models and data to the community. Community Model and Data module manages trained models and annotated data of IOS groups. Each group has a group benchmark dataset, the dataset includes data randomly selected from ground truth data contributed by IIOS within IIOS groups. The system evaluates IIOS models with the group benchmark dataset to generate scores. It ranks IIOS models within a group using the evaluation scores. The model that has the best score is selected as the "champion" model. The "champion" model is then scored against each IIOS model, using the data specific to the IIOS. If the "champion" model generates better score, then it will be used for updating the model of the compared IIOS. The "champion" model is also transferred to a new IOS (through standard model transfer and domain adaptation process). This aims at giving each IOS the best off-the-shelf performance.

What is claimed:

1. An edge device for comprising at least one embedded processor to perform cognitive analysis over high definition video frames by using a Multitask Embedded Deep Learning software configured to mimic human multi-level cortex function, wherein the software analyze the video frames at real time within the at least one embedded processor and the video frames are not streamed to cloud processing, the device comprising:

a video camera positioned to view a selected area of interest, wherein the at least one embedded processor is used for analyzing digital video frames output from the video camera;

a memory connected to the at least one embedded processor;

a mission control program module for translating user instructions into configuration parameters;

a vision analysis program module loaded into the memory, wherein the vision analysis program module is coupled with the mission control program module to receive configuration parameters and perform the following steps in response to the configuration parameters:
- selecting a designated pre-trained ML model based on time of operation and scene to detect motion and identify an area with movements from the video frames;
- computing motion mask and high motion ROI based on spatial temporal information of the identified area enhanced by using mathematical filters;
- computing Static ROI for relatively static areas over the video frames;
- determining multi-target tracking mode based on the configuration parameters; and
- locking a plurality of targets if multi-target tracking mode is determined, wherein the plurality of targets is selected based on criteria included in the configuration parameters, and are tracked by using a combination of long term feature learning and short term correlation filters with channel and spatial reliability (CSR);

a pluggable Feature Map LU including a simple neural network backbone loaded into the memory, wherein the pluggable Feature Map LU is coupled to the vision analysis program module to receive the high motion ROI, define a bounding box based on the high motion ROI, crop the video frames using the bounding box, and generate feature data included in a multi-resolution feature map by processing the cropped video frames with the simple neural network backbone;

a pluggable Classifier LU including a fully connected network (FCN) and a standard regressor FCN network loaded into the memory, wherein the pluggable Classifier LU is coupled to the pluggable Feature Map LU to receive the multi-resolution feature map and identify an object of interest in response to the multi-resolution feature map by performing the following steps:
- predicting, by using the fully connected network (FCN), object classes at predefined anchor regions;
- generating, by using the standard regressor FCN network, the bounding box offset from the predefined anchor regions; and
- generating, by using the fully convoluted network (FCN), a segmentation mask and a skeleton of the identified object of interest;

a pluggable Tracker LU including a recurrent neural network (RNN) loaded into the memory, wherein the pluggable Tracker LU is coupled to the pluggable Feature Map LU to receive the multi-resolution feature map, coupled to the vision analysis program module to receive spatial temporal information, and perform the following steps by using the recurrent neural network in response to the multi-resolution feature map and spatial temporal information:
- setting focus on locations included in the spatial temporal information; and
- processing the focused locations in high resolution;

an object segmentation program module comprising the pluggable Feature Map LU, the pluggable Classifier LU and the pluggable Tracker LU, wherein the object segmentation program module is coupled to the vision analysis program module to receive the high motion ROI, coupled to the mission control program module to receive configuration parameters, determine specific target tracking mode in response to the configuration parameters, and perform the following steps if specific target tracking mode is determined:
- configuring the video camera to move and zoom in,
- configuring the Feature Map LU to generate feature maps in high resolution,
- utilizing the high motion ROI received from the vision analysis program module to execute the Feature Map LU in response to the high motion ROI, and
- utilizing a directed acyclic graph to couple with the pluggable Feature Map LU to receive the multi-resolution feature map, the directed acyclic graph executes the pluggable Classifier LU and the pluggable Tracker LU in response to the multi-resolution feature map by providing shared access to the multi-resolution feature map; and a behavior analysis program module including two independent neural network backbones coupled to a neural network top layer loaded into the memory, wherein the behavior analysis program module is coupled to the object segmentation program module to receive a sequence of skeleton data, and coupled to the mission control program module to receive configuration parameters to perform the following steps in response to the configuration parameters:
- selecting a designated behavioral set according to the configuration parameters,
- generating a first sequence of relative locations of skeleton joints and a second sequence of motion vector of skeleton joints within a configurable timespan based on the designated behavioral set in response to the sequence of skeleton data received from the object segmentation program module, and
- utilizing a data feed software to execute the two independent neural network backbones to process the first and the second sequence of skeleton joints, transform output produced by the two independent neural network backbones into input acceptable by the neural network top layer, and execute the neural network top layer to produce predictions.

2. The device of claim 1, wherein the Classifier software classifies the identified object of interest into a number of object classes determined dynamically according to the configuration parameters.

3. The device of claim 1, wherein the behavior analysis program module is further configured to combine a plurality of sequences of skeleton data to define group behaviors.

4. The device of claim 1, wherein the pluggable Tracker LU can self-configure dynamically to automatically focus attention on locations within viewing, audible and radio range of the camera.

5. The device in claim 1, wherein the selection of the designated pre-trained ML model allows the visual analysis program module to implement more efficient predefined computer vision algorithms on traditional digital signal processing (DSP) pipelines within the embedded processors.

6. The device of claim 1, wherein the mission control program module supports a plurality of usage scenarios simultaneously comprising public security, pedestrian analysis and smart parking management.

7. The device of claim 1, wherein a cloud machine training center continuously updates the visual analysis program module with new machine learning models.

8. The device of claim 7, wherein the cloud machine learning training center refines machine learning models using real scene-specific video and image data captured from the video camera.

9. The device of claim 7, wherein the cloud machine learning training center comprises a Community Model and Data Unit configured to generate models from a group of observer systems with similar usage scenarios, use common benchmark dataset to rank the generated models, and designate a best ranking champion model for new observer systems.

10. A cognitive analysis method using high definition video frames with a Multitask Embedded Deep Learning software configured to mimic human multi-level cortex function, the method comprising:
   analyzing digital video frames output from a video camera positioned to view a selected area of interest;
   translating, via a mission control program module, user instructions into configuration parameters;
   identify an area with movements from the video frames by using a vision analysis program module, and computing high motion ROI based on spatial temporal information from the identified area, wherein the vision analysis program module computes both motion masks and the high motion ROI using mathematical filters to enhance spatio-temporal characteristics;
   utilizing a pluggable Feature Map LU including a simple neural network backbone for receiving the high motion ROI to generate a multi-resolution feature map;
   receiving the multi-resolution feature map into a pluggable Classifier LU including a fully connected network (FCN) and a standard regressor FCN network, and identifying an object of interest in response to the multi-resolution feature map;
   setting focus on locations included in the spatial temporal information in high resolution via a pluggable Tracker LU including a recurrent neural network (RNN);
   executing the Feature Map LU in response to the high motion ROI, and executing the pluggable Classifier LU and the pluggable Tracker LU with shared access to the multi-resolution feature map; and
   utilizing a behavior analysis program module including two independent neural network backbones coupled to a neural network top layer to:
   select a designated behavioral set according to the configuration parameters,
   generate a first sequence of relative locations of skeleton joints and a second sequence of motion vector of skeleton joints based on the designated behavioral set, and
   utilize a data feed software to execute the two independent neural network backbones to process the first and the second sequence of skeleton joints, transform output produced by the two independent neural network backbones into input acceptable by the neural network top layer, and execute the neural network top layer to produce predictions, wherein the predictions use dual neural network backbones (spatial and temporal) specifically configured via mission control parameters.

* * * * *